United States Patent
Sabo

(10) Patent No.: US 11,694,140 B2
(45) Date of Patent: *Jul. 4, 2023

(54) SYSTEMS AND METHODS FOR GENERATING PRIORITIZATION MODELS AND PREDICTING WORKFLOW PRIORITIZATIONS

(71) Applicant: Asana, Inc., San Francisco, CA (US)

(72) Inventor: Gregory Louis Sabo, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,075

(22) Filed: Mar. 25, 2022

(65) Prior Publication Data
US 2022/0215315 A1 Jul. 7, 2022

Related U.S. Application Data

(63) Continuation of application No. 17/119,690, filed on Dec. 11, 2020, now Pat. No. 11,341,444, which is a
(Continued)

(51) Int. Cl.
G06Q 10/0631 (2023.01)
G06Q 10/0633 (2023.01)

(52) U.S. Cl.
CPC ... *G06Q 10/06316* (2013.01); *G06Q 10/0633* (2013.01)

(58) Field of Classification Search
CPC .......................................... G06Q 10/00–50/00
(Continued)

(56) References Cited

U.S. PATENT DOCUMENTS 5,233,687 A 8/1993 Henderson, Jr.
5,524,077 A 6/1996 Faaland
(Continued)

FOREIGN PATENT DOCUMENTS

CN 101305350 A 11/2008
CN 101563671 A 10/2009
(Continued)

OTHER PUBLICATIONS

Dawei Li, "Deepcham: Collaborative Edge-Mediated Adaptive Deep Learning for Mobile Object Recognition", 2016, IEEE/ACM, pp. 64-76. (Year: 2016).
(Continued)

*Primary Examiner* — Alan S Miller
(74) *Attorney, Agent, or Firm* — Esplin & Associates, PC

(57) ABSTRACT

Systems and methods for generating prioritization models and predicting workflow prioritizations are disclosed. Exemplary implementations may: manage environment state information maintaining a collaboration environment; effectuate presentation of a series of questions via a first client computing platform associated with the first user; receive user input from the first client computing platform; generate a first prioritization model based on the response information; and determine one or more priorities for the first user based on the first prioritization model such that a primary first unit of work within the first set of units of work is determined to be a higher priority than a secondary first unit of work within the first set of units of work.

20 Claims, 3 Drawing Sheets

Related U.S. Application Data continuation of application No. 16/212,333, filed on Dec. 6, 2018, now Pat. No. 10,956,845.

(58) Field of Classification Search
USPC .............................................. 705/7.11–7.42
See application file for complete search history.

(56) References Cited

U.S. PATENT DOCUMENTS

| | | | | |
|---|---|---|---|---|
| 5,530,861 | A | 6/1996 | Diamant | |
| 5,608,898 | A | 3/1997 | Turpin | |
| 5,611,076 | A | 3/1997 | Durflinger | |
| 5,623,404 | A | 4/1997 | Collins | |
| 5,721,770 | A | 2/1998 | Kohler | |
| 5,983,277 | A | 11/1999 | Heile | |
| 6,024,093 | A | 2/2000 | Cron | |
| 6,256,651 | B1 | 7/2001 | Tuli | |
| 6,292,830 | B1 | 9/2001 | Taylor | |
| 6,332,147 | B1 | 12/2001 | Moran | |
| 6,385,639 | B1 | 5/2002 | Togawa | |
| 6,621,505 | B1 | 9/2003 | Beauchamp | |
| 6,629,081 | B1 | 9/2003 | Cornelius | |
| 6,769,013 | B2 | 7/2004 | Frees | |
| 6,859,523 | B1* | 2/2005 | Jilk | G06Q 10/06 379/265.06 |
| 6,938,048 | B1* | 8/2005 | Jilk | G06Q 10/06 705/7.14 |
| 7,003,668 | B2* | 2/2006 | Berson | G06Q 20/4012 705/72 |
| 7,020,697 | B1 | 3/2006 | Goodman | |
| 7,039,596 | B1 | 5/2006 | Lu | |
| 7,039,654 | B1* | 5/2006 | Eder | G06Q 10/06 |
| 7,086,062 | B1 | 8/2006 | Faour | |
| 7,146,326 | B1* | 12/2006 | White | G06Q 10/06316 705/7.26 |
| 7,155,400 | B1* | 12/2006 | Jilk | G06Q 10/06316 705/7.41 |
| 7,349,920 | B1 | 3/2008 | Feinberg | |
| 7,401,131 | B2* | 7/2008 | Robertson | H04L 67/01 707/999.1 |
| 7,418,482 | B1 | 8/2008 | Lusher | |
| 7,428,723 | B2* | 9/2008 | Greene | G06Q 20/3829 709/201 |
| 7,640,511 | B1 | 12/2009 | Keel | |
| 7,644,145 | B2* | 1/2010 | Rockwell | H04L 67/10 709/224 |
| 7,676,542 | B2 | 3/2010 | Moser | |
| 7,702,532 | B2* | 4/2010 | Vigil | G06Q 10/1093 705/7.41 |
| 7,778,866 | B2* | 8/2010 | Hughes | G06Q 30/0282 705/7.42 |
| 7,779,039 | B2 | 8/2010 | Weissman | |
| RE41,737 | E* | 9/2010 | Leem | H04B 1/7083 370/335 |
| 7,792,795 | B1* | 9/2010 | Swartz | G06F 16/345 707/627 |
| 7,805,327 | B1 | 9/2010 | Schulz | |
| RE41,848 | E | 10/2010 | Daniell | |
| 7,831,978 | B2* | 11/2010 | Schaad | G06Q 10/06 715/208 |
| 7,840,943 | B2* | 11/2010 | Volkov | G06F 11/3664 717/124 |
| 7,917,855 | B1 | 3/2011 | Satish | |
| 7,941,453 | B1* | 5/2011 | Scheevel | G06F 16/27 707/802 |
| 7,945,469 | B2* | 5/2011 | Cohen | G06Q 10/06311 705/7.14 |
| 7,996,744 | B2 | 8/2011 | Ojala | |
| 7,996,774 | B1 | 8/2011 | Sidenur | |
| 8,214,747 | B1 | 7/2012 | Yankovich | |
| 8,314,809 | B1 | 11/2012 | Grabowski | |
| 8,499,300 | B2* | 7/2013 | Zimberg | G06Q 10/06 718/103 |
| 8,522,240 | B1 | 8/2013 | Merwarth | |
| 8,527,287 | B1 | 9/2013 | Bhatia | |
| 8,554,832 | B1 | 10/2013 | Moskovitz | |
| 8,572,477 | B1 | 10/2013 | Moskovitz | |
| 8,626,547 | B2* | 1/2014 | Hirano | G06Q 10/10 705/7.17 |
| 8,627,199 | B1 | 1/2014 | Handley | |
| 8,639,552 | B1 | 1/2014 | Chen | |
| 8,768,751 | B2 | 7/2014 | Jakowski | |
| 8,831,879 | B2 | 9/2014 | Stamm | |
| 8,843,832 | B2 | 9/2014 | Frields | |
| 8,863,021 | B1 | 10/2014 | Bee | |
| 9,009,096 | B2 | 4/2015 | Pinckney | |
| 9,024,752 | B2 | 5/2015 | Tumayan | |
| 9,143,839 | B2 | 9/2015 | Reisman | |
| 9,152,668 | B1 | 10/2015 | Moskovitz | |
| 9,201,952 | B1 | 12/2015 | Chau | |
| 9,208,262 | B2 | 12/2015 | Bechtel | |
| 9,251,484 | B2 | 2/2016 | Cantor | |
| 9,350,560 | B2 | 5/2016 | Hupfer | |
| 9,383,917 | B2 | 7/2016 | Mouton | |
| 9,405,532 | B1 | 8/2016 | Sullivan | |
| 9,405,810 | B2 | 8/2016 | Smith | |
| 9,454,623 | B1 | 9/2016 | Kaptsan | |
| 9,514,424 | B2* | 12/2016 | Kleinbart | G06Q 10/06 |
| 9,600,136 | B1 | 3/2017 | Yang | |
| 9,674,361 | B2 | 6/2017 | Ristock | |
| 9,712,576 | B1 | 7/2017 | Gill | |
| 9,785,445 | B2 | 10/2017 | Mitsui | |
| 9,830,398 | B2 | 11/2017 | Schneider | |
| 9,842,312 | B1* | 12/2017 | Rosati | G06Q 10/1053 |
| 9,949,681 | B2 | 4/2018 | Badenes | |
| 9,953,282 | B2 | 4/2018 | Shaouy | |
| 9,959,420 | B2 | 5/2018 | Kiang | |
| 9,978,040 | B2 | 5/2018 | Lee | |
| 9,990,636 | B1 | 6/2018 | Lewis | |
| 10,001,911 | B2 | 6/2018 | Breedvelt-Schouten | |
| 10,003,693 | B2 | 6/2018 | Wolthuis | |
| 10,083,412 | B2 | 9/2018 | Suntinger | |
| 10,157,355 | B2 | 12/2018 | Johnson | |
| 10,192,181 | B2 | 1/2019 | Katkar | |
| 10,235,156 | B2 | 3/2019 | Johnson | |
| 10,264,067 | B2 | 4/2019 | Subramani | |
| 10,308,992 | B2 | 6/2019 | Chauvin | |
| 10,373,084 | B2 | 8/2019 | Kurjanowicz | |
| 10,373,090 | B2 | 8/2019 | Holm | |
| 10,382,501 | B2 | 8/2019 | Malatesha | |
| 10,455,011 | B2 | 10/2019 | Kendall | |
| 10,496,943 | B2 | 12/2019 | De | |
| 10,594,788 | B2 | 3/2020 | Larabie-Belanger | |
| 10,606,859 | B2 | 3/2020 | Smith | |
| 10,613,735 | B1 | 4/2020 | Karpe | |
| 10,616,151 | B1 | 4/2020 | Cameron | |
| 10,623,359 | B1 | 4/2020 | Rosenstein | |
| 10,671,692 | B2 | 6/2020 | Koopman | |
| 10,684,870 | B1 | 6/2020 | Sabo | |
| 10,706,484 | B1 | 7/2020 | Murnock | |
| 10,785,046 | B1 | 9/2020 | Raghavan | |
| 10,810,222 | B2 | 10/2020 | Koch | |
| 10,846,105 | B2 | 11/2020 | Granot | |
| 10,846,297 | B2 | 11/2020 | Smith | |
| 10,922,104 | B2 | 2/2021 | Sabo | |
| 10,956,845 | B1 | 3/2021 | Sabo | |
| 10,970,299 | B2 | 4/2021 | Smith | |
| 10,977,434 | B2 | 4/2021 | Pelz | |
| 10,983,685 | B2 | 4/2021 | Karpe | |
| 11,082,281 | B2 | 8/2021 | Rosenstein | |
| 11,095,468 | B1 | 8/2021 | Pandey | |
| 11,113,667 | B1 | 9/2021 | Jiang | |
| 11,138,021 | B1 | 10/2021 | Rosenstein | |
| 11,140,174 | B2 | 10/2021 | Patel | |
| 11,204,683 | B1 | 12/2021 | Sabo | |
| 11,212,242 | B2 | 12/2021 | Cameron | |
| 11,263,228 | B2 | 3/2022 | Koch | |
| 11,288,081 | B2 | 3/2022 | Sabo | |
| 11,290,296 | B2 | 3/2022 | Raghavan | |
| 11,327,645 | B2 | 5/2022 | Karpe | |
| 11,341,444 | B2 | 5/2022 | Sabo | |
| 11,341,445 | B1 | 5/2022 | Cheng | |
| 2002/0065798 | A1 | 5/2002 | Bostleman | |

(56) References Cited

U.S. PATENT DOCUMENTS

| | | |
|---|---|---|
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Booking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1* | 10/2006 | Butt ............... G06Q 10/063116 705/7.19 |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1* | 5/2009 | Gunning ............... G06Q 10/06 718/103 |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1* | 8/2009 | Elenbaas ............... G06Q 10/06 726/28 |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2009/0307349 A1 | 12/2009 | Harris |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1* | 11/2012 | Kleinbart ............... G06Q 10/06 709/204 |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |

(56) References Cited

U.S. PATENT DOCUMENTS

| | | | |
|---|---|---|---|
| 2013/0018688 A1 | 1/2013 | Nudd | |
| 2013/0021629 A1 | 1/2013 | Kurilin | |
| 2013/0066944 A1 | 3/2013 | Laredo | |
| 2013/0067375 A1 | 3/2013 | Kim | |
| 2013/0067549 A1 | 3/2013 | Caldwell | |
| 2013/0073328 A1 | 3/2013 | Ehrler | |
| 2013/0103412 A1 | 4/2013 | Nudd | |
| 2013/0124638 A1 | 5/2013 | Barreto | |
| 2013/0151421 A1 | 6/2013 | Van Der Ploeg | |
| 2013/0151604 A1 | 6/2013 | Ranade | |
| 2013/0173486 A1 | 7/2013 | Peters | |
| 2013/0179208 A1 | 7/2013 | Chung | |
| 2013/0179799 A1 | 7/2013 | Savage | |
| 2013/0215116 A1 | 8/2013 | Siddique | |
| 2013/0227007 A1 | 8/2013 | Savage | |
| 2013/0246110 A1 | 9/2013 | Nakhayi Ashtiani | |
| 2013/0246399 A1 | 9/2013 | Schneider | |
| 2013/0254299 A1 | 9/2013 | Burshtein | |
| 2013/0275229 A1 | 10/2013 | Moganti | |
| 2013/0279685 A1 | 10/2013 | Kohler | |
| 2013/0317871 A1* | 11/2013 | Kulkarni | G06Q 10/063112 705/7.14 |
| 2013/0321467 A1 | 12/2013 | Tappen | |
| 2013/0339099 A1 | 12/2013 | Aidroos | |
| 2013/0339831 A1 | 12/2013 | Gulanikar | |
| 2014/0007005 A1 | 1/2014 | Libin | |
| 2014/0012603 A1 | 1/2014 | Scanlon | |
| 2014/0025767 A1 | 1/2014 | De Kezel | |
| 2014/0036639 A1 | 2/2014 | Boni | |
| 2014/0040780 A1 | 2/2014 | Artzt | |
| 2014/0040905 A1 | 2/2014 | Tadanobu | |
| 2014/0058801 A1 | 2/2014 | Deodhar | |
| 2014/0059910 A1 | 3/2014 | Norton | |
| 2014/0074536 A1 | 3/2014 | Meushar | |
| 2014/0089719 A1 | 3/2014 | Daum | |
| 2014/0101310 A1 | 4/2014 | Savage | |
| 2014/0156539 A1 | 6/2014 | Brunet | |
| 2014/0165001 A1 | 6/2014 | Shapiro | |
| 2014/0172478 A1 | 6/2014 | Vadasz | |
| 2014/0189017 A1 | 7/2014 | Prakash | |
| 2014/0200944 A1 | 7/2014 | Henriksen | |
| 2014/0208325 A1 | 7/2014 | Chen | |
| 2014/0215344 A1 | 7/2014 | Ligman | |
| 2014/0229609 A1 | 8/2014 | Wong | |
| 2014/0236663 A1 | 8/2014 | Smith | |
| 2014/0244334 A1 | 8/2014 | De | |
| 2014/0257894 A1 | 9/2014 | Melahn | |
| 2014/0279294 A1 | 9/2014 | Field-Darragh | |
| 2014/0288987 A1 | 9/2014 | Liu | |
| 2014/0310047 A1 | 10/2014 | De | |
| 2014/0310051 A1 | 10/2014 | Meng | |
| 2014/0350997 A1 | 11/2014 | Holm | |
| 2014/0364987 A1 | 12/2014 | Shikano | |
| 2015/0006448 A1 | 1/2015 | Gupta | |
| 2015/0007058 A1 | 1/2015 | Wooten | |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1 | 4/2015 | Rabinovici | |
| 2015/0134393 A1 | 5/2015 | De | |
| 2015/0153906 A1 | 6/2015 | Liao | |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0294245 A1 | 10/2015 | Nagar | |
| 2015/0312375 A1 | 10/2015 | Valey | |
| 2015/0317595 A1 | 11/2015 | De | |
| 2015/0339006 A1 | 11/2015 | Chaland | |
| 2015/0363092 A1 | 12/2015 | Morton | |
| 2015/0363733 A1 | 12/2015 | Brown | |
| 2015/0379472 A1 | 12/2015 | Gilmour | |
| 2016/0012368 A1* | 1/2016 | O'Connell | G06Q 10/06316 705/7.26 |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1 | 3/2016 | Kass | |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1 | 5/2016 | Figlin | |
| 2016/0147773 A1 | 5/2016 | Smith | |
| 2016/0147846 A1 | 5/2016 | Smith | |
| 2016/0148157 A1 | 5/2016 | Walia | |
| 2016/0180277 A1 | 6/2016 | Skiba | |
| 2016/0180298 A1 | 6/2016 | McClement | |
| 2016/0182311 A1 | 6/2016 | Borna | |
| 2016/0188145 A1 | 6/2016 | Vida | |
| 2016/0216854 A1 | 7/2016 | McClellan | |
| 2016/0224939 A1 | 8/2016 | Chen | |
| 2016/0234391 A1 | 8/2016 | Wolthuis | |
| 2016/0275436 A1 | 9/2016 | Kurjanowicz | |
| 2016/0300024 A1 | 10/2016 | Janssen | |
| 2016/0313934 A1 | 10/2016 | Isherwood | |
| 2016/0328217 A1 | 11/2016 | Hagerty | |
| 2016/0342927 A1 | 11/2016 | Reznik | |
| 2017/0004213 A1* | 1/2017 | Cunico | G06F 16/2477 |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0039503 A1 | 2/2017 | Jones | |
| 2017/0061341 A1 | 3/2017 | Haas | |
| 2017/0068933 A1 | 3/2017 | Norton | |
| 2017/0093874 A1 | 3/2017 | Uthe | |
| 2017/0099296 A1 | 4/2017 | Fisher | |
| 2017/0103369 A1 | 4/2017 | Thompson | |
| 2017/0116552 A1 | 4/2017 | Deodhar | |
| 2017/0132200 A1 | 5/2017 | Noland | |
| 2017/0147960 A1 | 5/2017 | Jahagirdar | |
| 2017/0153799 A1 | 6/2017 | Hoyer | |
| 2017/0154024 A1 | 6/2017 | Subramanya | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1 | 7/2017 | Deshpande | |
| 2017/0249577 A1 | 8/2017 | Nishikawa | |
| 2017/0316367 A1 | 11/2017 | Candito | |
| 2017/0317898 A1 | 11/2017 | Candito | |
| 2017/0323233 A1 | 11/2017 | Bencke | |
| 2017/0323267 A1 | 11/2017 | Baek | |
| 2017/0323350 A1 | 11/2017 | Laderer | |
| 2017/0344754 A1 | 11/2017 | Kumar | |
| 2017/0346861 A1 | 11/2017 | Pearl | |
| 2017/0351385 A1 | 12/2017 | Ertmann | |
| 2018/0032524 A1* | 2/2018 | Byron | G09B 7/02 |
| 2018/0052943 A1 | 2/2018 | Hui | |
| 2018/0053127 A1 | 2/2018 | Boileau | |
| 2018/0059910 A1 | 3/2018 | Wooten | |
| 2018/0060785 A1 | 3/2018 | Carnevale | |
| 2018/0060818 A1 | 3/2018 | Ishiyama | |
| 2018/0063063 A1 | 3/2018 | Yan | |
| 2018/0068271 A1 | 3/2018 | Abebe | |
| 2018/0075387 A1 | 3/2018 | Kulkarni | |
| 2018/0088754 A1 | 3/2018 | Psenka | |
| 2018/0089625 A1 | 3/2018 | Rosati | |
| 2018/0095938 A1 | 4/2018 | Monte | |
| 2018/0102989 A1 | 4/2018 | Borsutsky | |
| 2018/0131649 A1 | 5/2018 | Ma | |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1 | 7/2018 | Newhouse | |
| 2018/0189736 A1 | 7/2018 | Guo | |
| 2018/0225795 A1 | 8/2018 | Napoli | |
| 2018/0247352 A1 | 8/2018 | Rogers | |
| 2018/0260081 A1 | 9/2018 | Beaudoin | |
| 2018/0262620 A1* | 9/2018 | Wolthuis | H04M 3/5235 |
| 2018/0285471 A1 | 10/2018 | Hao | |
| 2018/0316636 A1 | 11/2018 | Kamat | |
| 2018/0331842 A1 | 11/2018 | Faulkner | |
| 2018/0357049 A1 | 12/2018 | Epstein | |
| 2018/0367477 A1 | 12/2018 | Hariram | |
| 2018/0367483 A1 | 12/2018 | Rodriguez | |

(56) References Cited

U.S. PATENT DOCUMENTS

| | | |
|---|---|---|
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1* | 4/2019 | Babu ............... G06N 5/025 |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0219061 A1 | 7/2020 | Guo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0319389 A1 | 10/2021 | Jafari |
| 2021/0320891 A1 | 10/2021 | Rosenstein |
| 2021/0342786 A1 | 11/2021 | Jiang |
| 2021/0350303 A1 | 11/2021 | Omar |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0171637 A1 | 6/2022 | Sabo |
| 2022/0188715 A1 | 6/2022 | Cheng |
| 2022/0214787 A1 | 7/2022 | Karpe |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

Creating Tables with Fields from 2 Different Tables, published: 2009, publisher: StackOverflow, pp. 1-2. (Year: 2009).

"Rules of Data Conversion from Document to Relational Databases", published: 2014, publisher: Future-processing, pp. 1-8 (Year: 2014).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

(Tiburca, Andrew) Best Team Calendar Applications for 2018—Toggl https://toggl.com/blog/best-team-calendar-applications-for-2018 (Year: 2017).

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

(56) References Cited

OTHER PUBLICATIONS

Command and control, wikipedia, archives org, Mar. 16, 2018 https://web.archive.org/web/20180316193655/https://en.wikipedia.org/wiki/Command_and_control (Year: 2018), 6 pages.

Hartmann, "TimeProjectscheduling with resource capacities and requests varying with time: a case study," 2013, Flexible services and manufacturing journal, vol. 25, No. 1, pp. 74-93 (Year: 2013).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Paul Minors, How to automate your tasks, youtube excerpts, Oct. 18, 2019 https://www.youtube.com/watch?v=IwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

www.cogmotive.com/blog/author/alan Alan Byrne: "Creating a company Shared Calendar in Office 365"; pp. 1-17; Sep. 10, 2013.

Macro, computer science, wikipedia, archives org, 6 pages, Feb. 11, 2020 http://web.archive.org/web/20200211082902/https://en.wikipedia.org/wiki/Macro_(computer_science) (Year: 2020).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

\* cited by examiner

SYSTEMS AND METHODS FOR GENERATING PRIORITIZATION MODELS AND PREDICTING WORKFLOW PRIORITIZATIONS

FIELD OF THE DISCLOSURE

The present disclosure relates to systems and methods for generating prioritization models and predicting workflow prioritizations.

BACKGROUND

Collaboration environments enable users to assign projects, tasks, or other assignments to assignees to complete. Such collaboration environments enable users to work in a more organized and efficient manner. However, determining how to prioritize units of work is one common area where efficiency may be lost.

SUMMARY

Users utilizing the work management platform often have several units of work they are associated with or responsible for at any given time. Deciding which units of work to prioritize can be difficult and/or cause user to lose efficiency. Some users may choose to prioritize the wrong units of work. Determining what users should prioritize based on prioritization models generated based on their answers to a series of questions may solve these problems. In some implementations, machine learning may be used to automatically determine the prioritization of tasks.

One aspect of the present disclosure relates to a system configured for generating prioritization models and predicting workflow prioritizations. The system may include one or more hardware processors configured by machine-readable instructions. The processor(s) may be configured to manage environment state information maintaining a collaboration environment. The environment state information may include values of user parameters and values of work unit parameters. The values of the user parameters may be organized in user records corresponding to users interacting with and viewing the collaboration environment and the values of the work unit parameters are organized in work unit records corresponding to units of work managed, created, and/or assigned within the collaboration environment. The units of work may include a first set of units of work associated with a first user.

The processor(s) may be configured to effectuate presentation of a series of questions via a first client computing platform associated with the first user. The processor(s) may be configured to receive user input from the first client computing platform. The user input may include response information in response to the series of questions. The processor(s) may be configured to generate a first prioritization model based on the response information. The processor(s) may be configured to determine one or more priorities for the first user based on the first prioritization model such that a primary first unit of work within the first set of units of work is determined to be a higher priority than a secondary first unit of work within the first set of units of work. Effectuate presentation of a graphical user interface may display an indication of the one or more priorities determined for the first user. The graphical user interface may include an indication that the primary first unit of work is a higher priority than the secondary first unit of work.

In some implementations, a system configured for generating prioritization models and predicting workflow prioritizations, may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, a question component, a user input component, a prioritization model component, a priority component, a graphical user interface component, and/or other components.

The environment state component may be configured to manage environment state information. The environment state information may maintain a collaboration environment. The environment state information may include values of user parameters, values of work unit parameters, and/or values of other parameters. The values of the user parameters may be organized in user records corresponding to users interacting with and viewing the collaboration environment. The values of the work unit parameters may be organized in work unit records corresponding to units of work managed, created, and/or assigned within the collaboration environment. The units of work may include a first set of units of work associated with a first user.

The question component may be configured to effectuate presentation of a series of questions. The series of questions may be presented to the first user via a first client computing platform associated with the first user. In some implementations, the series of questions may include one or more predetermined questions, comparisons of units of work associated with the given user, and/or other questions. The user input component may be configured to receive user input from the first client computing platform. The user input may include response information in response to the series of questions. By way of non-limiting example, if the series of questions includes one or more comparisons of units of work, the user may select the higher priority unit of work from the two or more units of work compared. As such, the user input received from the first client computing platform may include one or more selections of individual ones of the units of work associated with the first user from the one or more comparisons.

The prioritization model component may be configured to generate a first prioritization model based on the response information. The first prioritization model may be used to determine one or more priorities for the first user. In some implementations, the prioritization model component may be configured to obtain values for the user parameters associated with the first user, values for the work unit parameters associated with one or more of the units of work associated with the first user, and/or other information. The prioritization model may be determined based on the response information, the values for the user parameters associated with the first user, the values for the work unit parameters associated with one or more of the units of work associated with the first user, and/or other information.

In some implementations, the prioritization component may use neural networks to determine the prioritization models corresponding to individual users. The first prioritization model may be generated using a neural network based on the response information, the values for the user parameters associated with the first user, the values for the work unit parameters associated with one or more of the units of work associated with the first user, and/or other information. In some implementations, the values for the user parameters associated with the first user and/or the values for the work unit parameters associated with one or more of the units of work associated with the first user indicate previous actions of the first user within the collaboration environment.

In some implementations, the first prioritization model may be determined at least partially based on the prioritization information. The prioritization component may be configured to receive secondary user input including the prioritization information. The prioritization information may characterize units of work that should be prioritized by a given user (e.g., the first user for the first prioritization model). By way of example, a manager, boss, and/or other superior may provide the secondary input.

In some implementations, the prioritization model component may be configured to export the first prioritization model. The first prioritization model may be exported responsive to the prioritization model component receiving a request to export the first prioritization model.

The priority component may be configured to determine one or more priorities for the first user. The one or more priorities for the first user may be determined based on the first prioritization model. As such, a primary first unit of work within the first set of units of work may be determined to be a higher priority than a secondary first unit of work within the first set of units of work. A given unit of work having a high priority than another unit of work may indicate the given unit of work should be completed prior to the other unit of work. Such a determination may be based on other units of work dependent on and/or associated with the given unit of work, the assigning or managing user associated with the given unit of work, the length of the given unit of work, the level of involvement of the given unit of work, the followers for a given unit of work, the due date and/or start date information for a given unit of work, and/or other information.

The graphical user interface component may be configured to effectuate presentation of a graphical user interface displaying an indication of the one or more priorities determined for the first user. For example, the graphical user interface may include an indication that the primary first unit of work is a higher priority than the secondary first unit of work. In some implementations, the indication of the one or more priorities may include a recommendation of an individual unit of work for the first user to prioritize, a list of the first units of work in the first set of tasks ranked according to the priorities determined, a visual indication that the primary first unit of work is a higher priority than a secondary first unit of work, an auditory indication that the primary first unit of work is a higher priority than a secondary first unit of work, and/or other indications.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
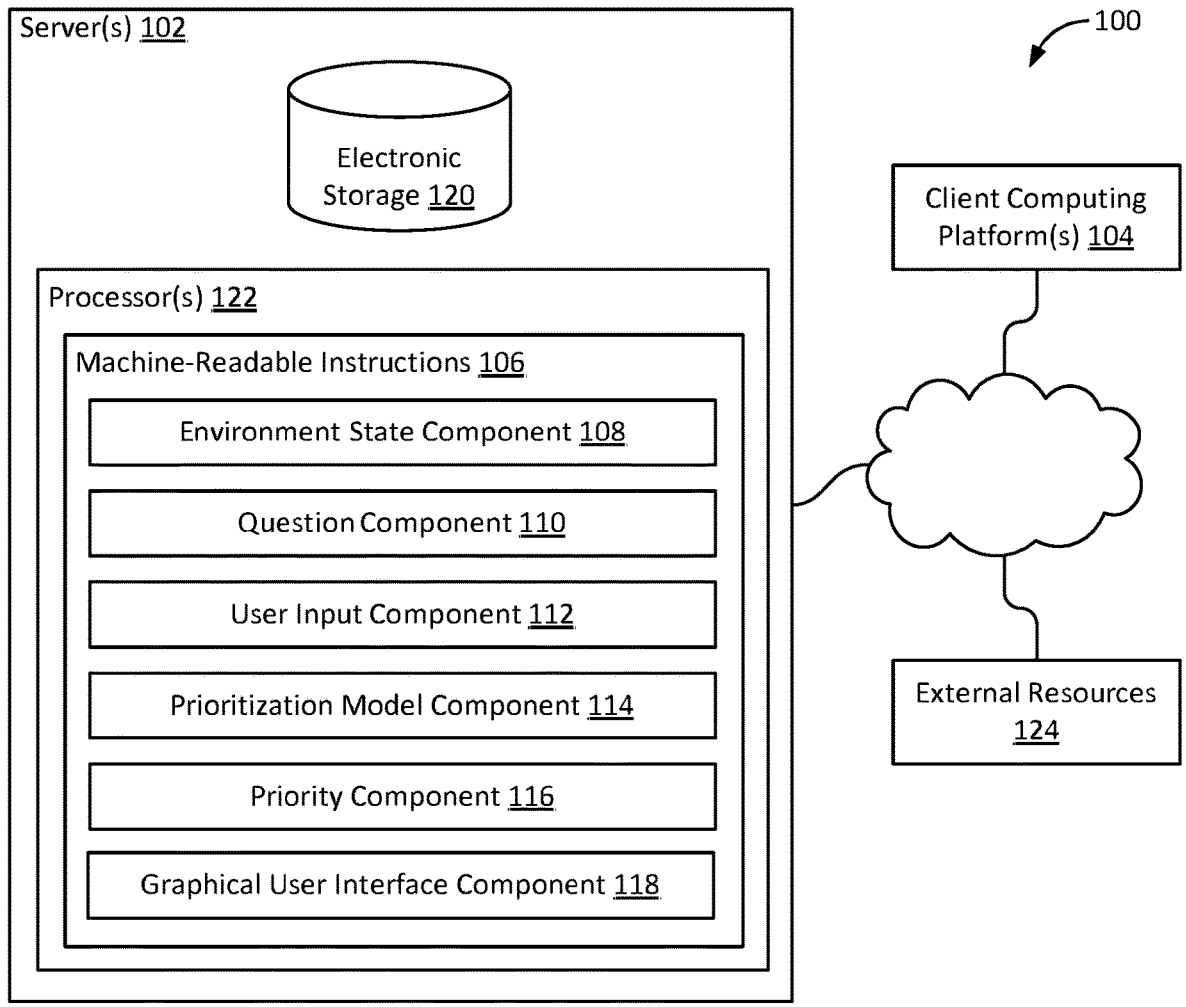
FIG. 1 shows a system configured for generating prioritization models and predicting workflow prioritizations, in accordance with one or more implementations.

FIG. 1 illustrates a system 100 configured for generating prioritization models and predicting workflow prioritizations, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an environment state component 108, a question component 110, a user input component 112, a prioritization model component 114, a priority component 116, a graphical user interface component 118, and/or other instruction components.

Environment state component 108 may be configured to manage environment state information maintaining a collaboration environment. The environment state information may include values of user parameters and values of work unit parameters. By way of non-limiting example, the values of the user parameters may be organized in user records corresponding to users interacting with and viewing the collaboration environment and the values of the work unit parameters are organized in work unit records corresponding to units of work managed, created, and/or assigned within the collaboration environment. The units of work may include a first set of units of work associated with a first user.

The work unit parameters for work units managed, created, and/or assigned within the collaboration environment may include parameters describing one or more work units managed, created, and/or assigned within the collaboration environment and/or via the collaboration work management platform, and/or the metadata associated with the one or more work units. Individual ones of the work units may be associated with individual ones of the work unit records. A work unit record may define values of the work unit parameters associated with a given work unit managed, created, and/or assigned within the collaboration environment and/or via the collaboration work management platform. A given work unit may have one or more owners and/or one or more team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given work unit may include one or more projects, tasks, sub-tasks, and/or other units of work possibly assigned to and/or associated with one or more users.

The work unit parameters may, by way of non-limiting example, include one or more of: one or more units of work, one or more user comment parameters (e.g., a creator, a recipient, one or more followers, one or more other interested parties, content, one or more times, up-votes, other hard-coded responses, etc.), a work unit name, a work unit description, one or more work unit dates (e.g., a start date, a due date, a completion date, and/or other work unit dates), one or more members associated with a unit of work (e.g., an owner, one or more other project/task members, member access information, and/or other work unit members and/or member information), a status and/or progress (e.g., an update, a hardcoded status update, a measured status, quantity of work units remaining in a given project, completed work units in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), other work unit parameters for the given work units, and/or other work unit parameters, and/or user parameters for one or more users and/or work units the given project is associated with.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a group parameter, a subset parameter, a user account, a user role, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other work unit order, etc.), one or more authorized applications, one or more presence/interaction parameters (e.g., indicating presence and/or interaction level at an environment level, work unit level, project level, task level, application level, etc.), one or more notification settings, one or more progress parameters, status information for one or more work units the user is associated with, one or more statistics related to a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, workload information, schedule information, historical information, other user parameters for the given user, and/or other user parameters and/or work unit parameters, for one or more work units the given user is associated with.

Question component 110 may be configured to effectuate presentation of a series of questions from which the prioritization models are determined. Question component 110 may be configured to effectuate presentation of a series of questions via a first client computing platform associated with the first user. The series of questions may include one or more predetermined questions. For example, the series of questions may include questions related to how the user typically completes units of work, how the user selects units of work to work on, when the user prefers to work, what types of units of work the user prefers to work on, the user's experience, the user's qualifications, the user's expertise, the user's supervisor or superior, the importance of a given unit of work (e.g., task, project, sub-task, and/or other units of work), and/or anything related to a user and/or how the user works or prioritizes work.

In some implementations, the series of questions may include one or more comparisons of units of work associated with the first user. The comparisons may include a comparison of two or more units of work, wherein the series of questions asks the user to select the highest priority unit of work and/or the lowest priority unit of work, and/or to rank the priority of the units of work presented. The user's selections of the units of work from the comparisons may be used to train the prioritization model for a given user.

User input component 112 may be configured to receive user input from the first client computing platform. The user input may include response information in response to the series of questions. The user input may include one or more selections, text input (e.g., answers), rankings, and/or other user input indicating answers to the individual questions in the series of questions. For example, the user input received from the first client computing platform may include one or more selections of individual ones of the units of work associated with the first user from the one or more comparisons.

In some implementations, user input component 112 may be configured to receive secondary user input including prioritization information. The prioritization information may characterize units of work that should be prioritized. By way of non-limiting example, the secondary user input may be input by a manager supervisor, team leader, project lead, a superior, and/or other managing users of the given user. By way of example, the prioritization information may indicate types, assigning users, and/or other characteristics of units of work the given user should prioritize.

Figure 2:
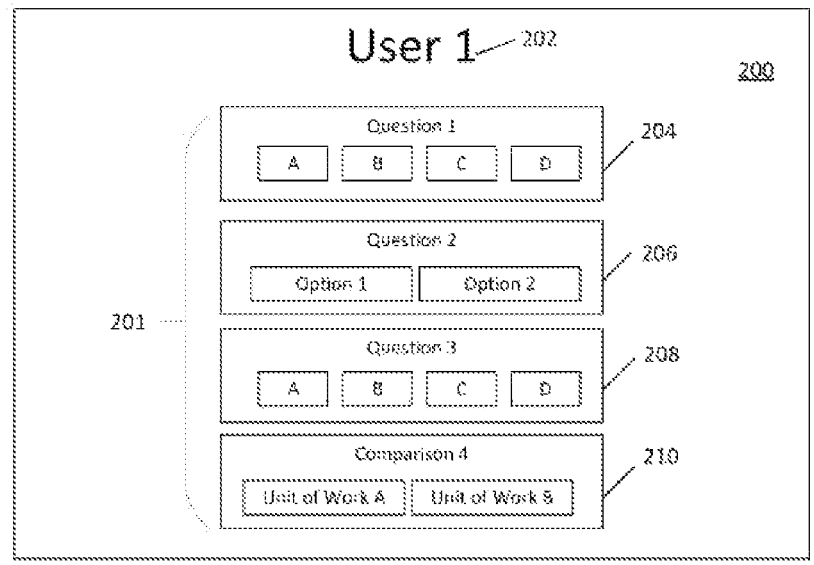
FIG. 2 illustrates a graphical user interface for presenting a series of questions to a user, in accordance with one or more implementations.

FIG. 2 illustrates a graphical user interface for presenting a series of questions to a user, in accordance with one or more implementations. Graphical user interface 200 may include a series of questions 201. Series of questions 201 may include questions 204,206, 208 including one or more user selectable options, comparison 210, and/or other questions. In some implementations, one or more questions in series of questions 201 may be predetermined. User 1 202 may provide user input in response to the series of questions 201. The user input may include the response information for questions 1-3 204, 206, 208 and comparison 4 210, and/or other user input and/or response information. In some implementations, graphical user interface 200 may be presented via a first client computing platform associated with User 1 202.

Returning to FIG. 1, prioritization model component 114 may be configured to generate a first prioritization model based on the response information. The response information may be used to train a prioritization model for determining one or more priorities for a given user. In some implementations, other information such as the prioritization information, values for the user parameters, values for the work unit parameters, and/or other information may be used at least partially as a basis for determining the first prioritization model. In some implementations, prioritization model component 114 may be configured to obtain values for the user parameters associated with the first user, values for the work unit parameters associated with one or more of the units of work associated with the first user, and/or other information. The units of work associated with the first user may include units of work assigned to the first user, units of work assigned by the first user, units of work associated with units of work assigned to and/or by the first user (e.g., an overarching unit of work, a unit of work under the same overarching unit of work, one or more sub units of work, and/or other associated units of work), and/or other units of work. The values for the user parameters the values for the user parameters associated with the first user and/or the values for the work unit parameters associated with one or more of the units of work associated with the first user may indicate previous actions of the first user within the collaboration environment. By way of non-limiting example, the prioritization model may be determined based on the response information, the values for the user parameters associated with the first user, and the values for the work unit parameters associated with one or more of the units of work associated with the first user.

By way of non-limiting example, the first prioritization model may be generated using a neural network based on the response information, the values for the user parameters associated with the first user, the values for the work unit parameters associated with one or more of the units of work associated with the first user, and/or other information.

In some implementations, prioritization model component 114 may be configured to receive a request to export the first prioritization model. Prioritization model component 114 may be configured to export the first prioritization model. The first prioritization model my be used for one or more other users besides the first user. For example, if the first user is a very productive user, the first prioritization model may be used as a prioritization model and/or as part of the basis of a prioritization model for one or more other users.

Priority component 116 may be configured to determine one or more priorities for the first user based on the first prioritization model. The one or more priorities may indicate which units of work the first user should prioritize, work on next, focus on, and/or put their attention towards. In some implementations, the priorities may or may not indicate importance of the one or more units of work indicated by the priorities. As such, for example, a primary first unit of work within the first set of units of work may be determined to be a higher priority than a secondary first unit of work within the first set of units of work by priority component 116.

Graphical user interface component 118 may be configured to effectuate presentation of a graphical user interface including the one or more priorities determined. The graphical user interface presented to the first user may display an indication of the one or more priorities determined for the first user. The graphical user interface may include an indication that the primary first unit of work is a higher priority than the secondary first unit of work. By way of non-limiting example, the indication of the one or more priorities may include a recommendation of an individual unit of work for the first user to prioritize, a list of the first units of work in the first set of tasks ranked according to the priorities determined, a visual indication (e.g., highlighting, value ranking, recommendation field, and/or other visual indication) that the primary first unit of work is a higher priority than a secondary first unit of work, an auditory indication, and/or other indication that the primary first unit of work is a higher priority than a secondary first unit of work.

Figure 3:
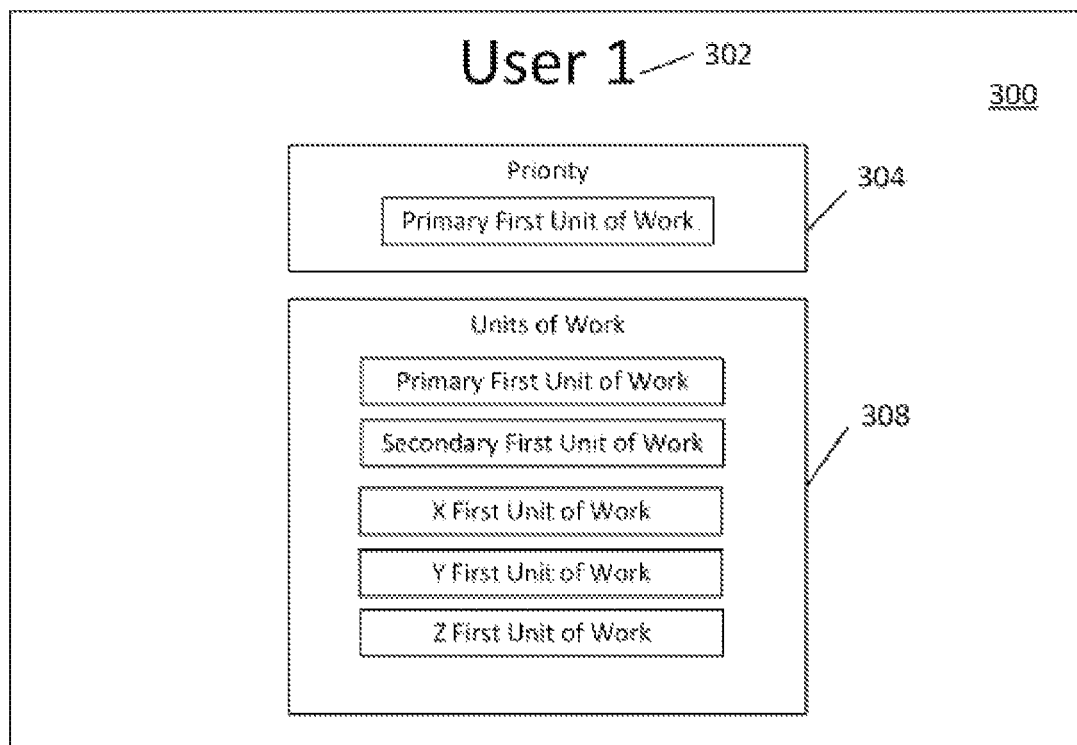
FIG. 3 illustrated a graphical user interface for displaying one or more priorities for a user, in accordance with one or more implementations.

FIG. 3 illustrated a graphical user interface for displaying one or more priorities for a user, in accordance with one or more implementations. Graphical user interface 300 may include one or more indications of priorities for User 1 302. Recommendation 304 may indicate a Primary First Unit of Work is a priority for User 1 302. Ranked listing 308 may indicate the priorities of the Primary First Unit of Work, the Secondary First Unit of Work, X First Unit of Work, Y First Unit of Work, and Z First Unit of Work for User 1 302. Ranked listing 308 may indicate that the Primary First Unit of Work is a higher priority than the Secondary First Unit of Work for User 1 302, the Secondary First Unit of Work is higher priority than the X First Unit of Work for User 1 302, and/or the Y First Unit of Work is higher priority than the Z First Unit of Work for User 1 302.

Returning to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 108, 110, 112, 114, 116, and/or 118, and/or other components. Processor(s) 122 may be configured to execute components 108, 110, 112, 114, 116, and/or 118 and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 122 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 122 may be configured to execute one or more additional components that may perform some or all of the functionality attributed below to one of components 108, 110, 112, 114, 116, and/or 118.

Figure 4:
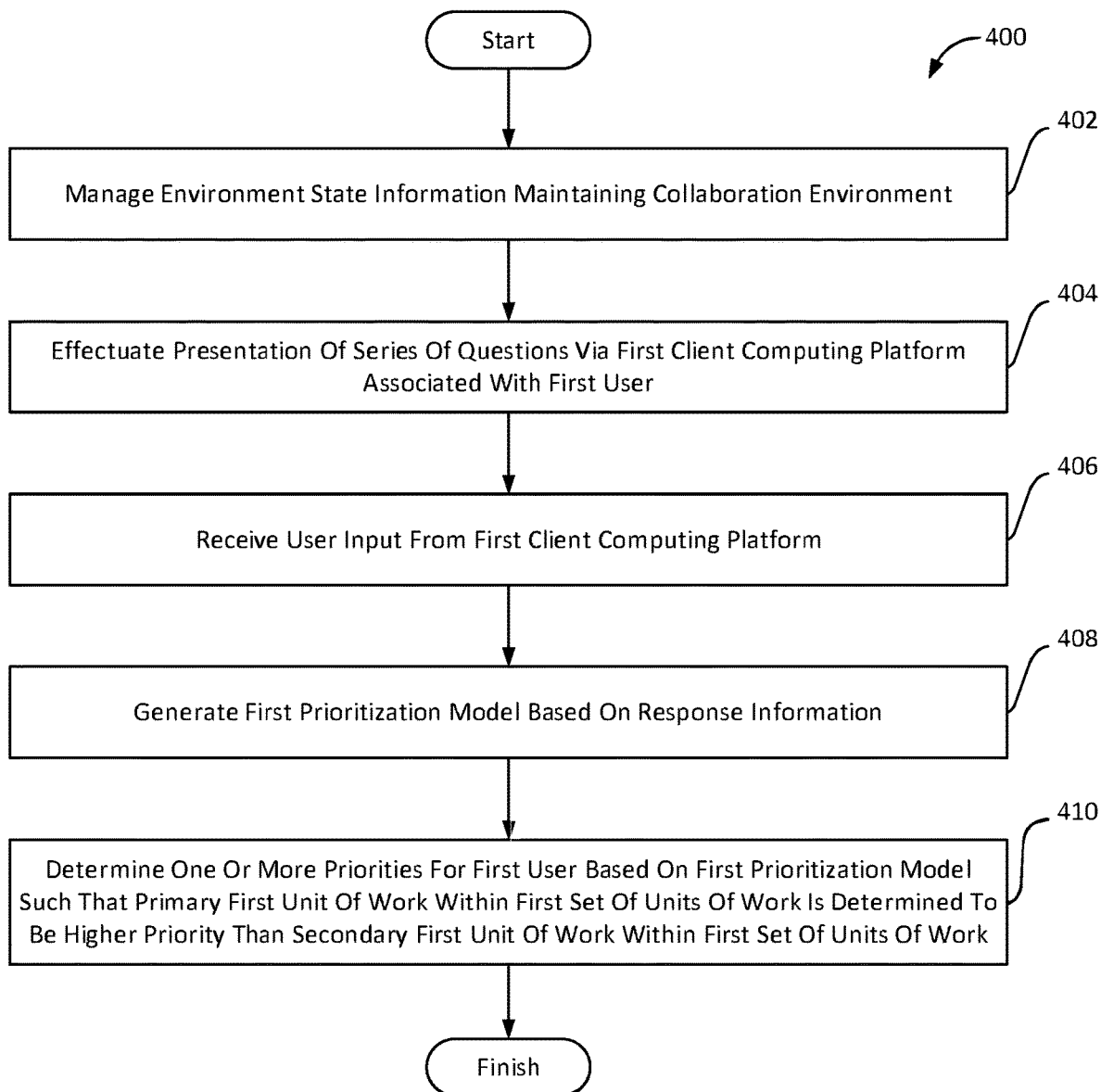
FIG. 4 includes a flow chart of a method for generating prioritization models and predicting workflow prioritizations, in accordance with one or more implementations.

FIG. 4 illustrates a method 400 for generating prioritization models and predicting workflow prioritizations, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include managing environment state information maintaining a collaboration environment. The environment state information may include values of user parameters and values of work unit parameters. The values of the user parameters may be organized in user records corresponding to users interacting with and viewing the collaboration environment and the values of the work unit parameters are organized in work unit records corresponding to units of work managed, created, and/or assigned within the collaboration environment. The units of work may include a first set of units of work associated with a first user. Operation 402 may be performed by one or more hardware processors configured by machine-readable instructions including a component that is the same as or similar to environment state component 108, in accordance with one or more implementations.

An operation 404 may include effectuating presentation of a series of questions via a first client computing platform associated with the first user. Operation 404 may be performed by one or more hardware processors configured by machine-readable instructions including a component that is the same as or similar to presentation effectuation component 110, in accordance with one or more implementations.

An operation 406 may include receiving user input from the first client computing platform. The user input may include response information in response to the series of questions. Operation 406 may be performed by one or more hardware processors configured by machine-readable instructions including a component that is the same as or similar to user input component 112, in accordance with one or more implementations.

An operation 408 may include generating a first prioritization model based on the response information. Operation 408 may be performed by one or more hardware processors configured by machine-readable instructions including a component that is the same as or similar to prioritization model generating component 114, in accordance with one or more implementations.

An operation 410 may include determining one or more priorities for the first user based on the first prioritization model. As such, a primary first unit of work within the first set of units of work may be determined to be a higher priority than a secondary first unit of work within the first set of units of work. The graphical user interface may display an indication of the one or more priorities determined for the first user. The graphical user interface may include an indication that the primary first unit of work is a higher priority than the secondary first unit of work. Operation 410 may be performed by one or more hardware processors configured by machine-readable instructions including a component that is the same as or similar to priority component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate prioritization models for work managed within an online collaboration environment, the system comprising:
    one or more hardware processors configured by machine-readable instructions to:
        generate a prioritization model by training the prioritization model based on responses to a prompted series of questions so that the prioritization model is trained in relation to the responses, the prompted series of questions being directed to how a user works or prioritizes work within a collaboration environment;
        determine one or more priorities for work assigned to the user based on the prioritization model so that some of the work assigned to the user is determined to have a relatively higher priority; and
        effectuate presentation of a graphical user interface displaying an indication of the one or more priorities determined for the work assigned to the user.

2. The system of claim 1, wherein the graphical user interface displays the collaboration environment, and wherein the prompted series of questions is presented within the graphical user interface.

3. The system of claim 1, wherein the prompted series of questions is presented in a dedicated model training graphical user interface.

4. The system of claim 1, wherein the one or more hardware processors are further configured by the machine-readable instructions to:
    manage environment state information maintaining the collaboration environment, the environment state information including values of user parameters and values of work unit parameters, wherein the values of the user parameters are organized in a user record corresponding to the user interacting with and viewing the collaboration environment and the values of the work unit parameters are organized in work unit records corresponding to the work assigned to the user; and
    wherein the prioritization model is trained based on the responses, the user record, and the work unit records.

5. The system of claim 1, wherein the prioritization model is generated using a neural network.

6. The system of claim 4, wherein the user record and/or the work unit records indicate previous actions of the user within the collaboration environment.

7. The system of claim 1, wherein the indication of the one or more priorities includes one or more of a recommendation to prioritize, a ranked list of the work assigned to the user, a visual indication of priority, or an auditory indication of priority.

8. The system of claim 1, wherein the one or more hardware processors are further configured by the machine-readable instructions to:
    receive response information conveying the responses to the prompted series of questions by the user; and
    receive prioritization information, the prioritization information characterizing a portion of the work assigned to the user that should be prioritized.

9. The system of claim 8, wherein the prioritization model is further trained based on the prioritization information.

10. The system of claim 1, wherein the one or more hardware processors are further configured by the machine-readable instructions to:
    receive a request to export the prioritization model; and
    export the prioritization model.

11. A method to generate prioritization models for work managed within an online collaboration environment, the method comprising:
    generating a prioritization model by training the prioritization model based on responses to a prompted series of questions so that the prioritization model is trained in relation to the responses, the prompted series of questions being directed to how a user works or prioritizes work within a collaboration environment;
    determining one or more priorities for work assigned to the user based on the prioritization model so that some of the work assigned to the user is determined to have a relatively higher priority; and
    effectuating presentation of a graphical user interface displaying an indication of the one or more priorities determined for the work assigned to the user.

12. The method of claim 11, wherein the graphical user interface displays the collaboration environment, and wherein the prompted series of questions is presented within the graphical user interface.

13. The method of claim 11, wherein the prompted series of questions is presented in a dedicated model training graphical user interface.

14. The method of claim 11, further comprising:
    managing environment state information maintaining the collaboration environment, the environment state information including values of user parameters and values of work unit parameters, wherein the values of the user parameters are organized in a user record corresponding to the user interacting with and viewing the collaboration environment and the values of the work unit parameters are organized in work unit records corresponding to the work assigned to the user; and
    wherein the prioritization model is trained based on the responses, the user record, and the work unit records.

15. The method of claim 11, wherein the prioritization model is generated using a neural network.

16. The method of claim 14, wherein the user record and/or the work unit records indicate previous actions of the users within the collaboration environment.

17. The method of claim 11, wherein the indication of the one or more priorities includes one or more of a recommendation to prioritize, a ranked list of the work assigned to the user, a visual indication of priority, or an auditory indication of priority.

18. The method of claim 11, further comprising:
receiving response information conveying the responses to the prompted series of questions by the user; and
receiving prioritization information, the prioritization information characterizing a portion of the work assigned to the user that should be prioritized.

19. The method of claim 18, wherein the prioritization model is further trained based on the prioritization information.

20. The method of claim 11, further comprising:
receiving a request to export the prioritization model; and
exporting the prioritization model.

* * * * *